United States Patent [19]

Izumisawa

[11] Patent Number: 6,065,216
[45] Date of Patent: May 23, 2000

[54] RECIPROCATING PNEUMATIC SAW

[75] Inventor: Osamu Izumisawa, Asahi-Chou, Japan

[73] Assignee: S.P. Air Kabusiki Kaisha, Nagano Pref., Japan

[21] Appl. No.: 09/271,678

[22] Filed: Mar. 18, 1999

Related U.S. Application Data

[60] Provisional application No. 60/118,444, Feb. 1, 1999.

[51] Int. Cl.$^7$ .................................................. B27B 19/00
[52] U.S. Cl. .............................................. 30/392; 30/277.4
[58] Field of Search ............................... 30/277.4, 166.3, 30/392, 393; 83/821

[56] References Cited

U.S. PATENT DOCUMENTS

| | | | |
|---|---|---|---|
| 3,596,525 | 8/1971 | Niesz ......................................... | 30/392 |
| 3,832,772 | 9/1974 | Sumida ..................................... | 30/392 |
| 4,434,859 | 3/1984 | Rumpp et al. .......................... | 173/114 |
| 4,864,727 | 9/1989 | Chu .......................................... | 30/392 |
| 5,615,746 | 4/1997 | Chu .......................................... | 30/392 |
| 6,006,435 | 12/1999 | Chien ....................................... | 30/392 |

*Primary Examiner*—Hwei-Siu Payer
*Attorney, Agent, or Firm*—Senniger, Powers, Leavitt & Roedel

[57] ABSTRACT

A pneumatic power tool for reciprocating a blade to cut a workpiece. The power tool includes a body having a hollow interior and a passage extending through the body between the hollow interior and an opening in an exterior surface of the body. The interior has first and second ports spaced apart at first and second positions along a central axis of the interior for alternately admitting air into the interior. The tool also includes a connector to connect a pneumatic hose to the tool for delivering pressurized air to the tool. A throttle is positioned along the passage for selectively permitting pressurized air to flow through the passage, and a valve is also positioned along the passage for alternately directing air through one of the first and second ports to pressurize the interior at a corresponding one of the first and second positions. Further, the tool includes a piston unit having a head received within the interior between the first and second positions for reciprocating the unit along a longitudinal axis between extended and retracted positions. One of the piston unit and the body has a groove extending parallel to the longitudinal axis of the unit, and another of the unit and body has a protrusion which engages the groove and which reciprocates in the groove as the piston unit reciprocates between the extended and retracted positions to prevent the unit from rotating relative to the body.

8 Claims, 3 Drawing Sheets

6,065,216

RECIPROCATING PNEUMATIC SAW

CROSS-REFERENCE TO RELATED APPLICATION

Priority is claimed to provisional application Ser. No. 60/118,444, filed Feb. 1, 1999.

BACKGROUND OF THE INVENTION

The present invention relates generally to reciprocating pneumatic saws and more particularly to a mechanism for preventing relative rotation between a piston unit and a body of the saw.

Reciprocating pneumatic saws are used to cut materials such as wood and metal. These saws have a body sized to be held in a user's hand and a throttle which the user actuates to control blade movement. A piston unit positioned in a cylinder inside the body drives the blade back and forth in response to air entering opposite ends of the cylinder when the user actuates the throttle. Because the cylinder and piston unit are cylindrical, the piston unit is free to turn in the cylinder, allowing the blade to rotate relative to the body of the saw.

In the past, various mechanisms have been used to prevent relative rotation between the blade and the body.

FIG. 5 shows one such conventional mechanism. This mechanism has a pair of ball bearings (designated by BB in FIG. 5) which are held in recesses formed in a blade holder H portion of the piston unit. The bearings BB engage a plate P attached to the body of the saw as the blade reciprocates to prevent the blade from rotating relative to the body. However, over time the mechanism wears and permits the blade to rotate relative to the body. Further, debris can lodge between the bearings BB and the blade holder H causing the mechanism to jam and preventing smooth movement of the blade. In addition, the mechanism requires periodic lubrication to ensure smooth movement of the blade, but the bearings are not freely accessible for lubrication. Moreover, due to the number of pieces which must be assembled and the possibility of dropping and losing the bearings, the mechanism is difficult and costly to assemble.

SUMMARY OF THE INVENTION

Among the several objects and features of the present invention may be noted the provision of a low cost anti-rotation mechanism having a long life; the provision of such a mechanism having low frictional forces; the provision of such a mechanism having low contact stresses; the provision of such a mechanism which inhibits jamming; and the provision of such a mechanism which is simple to assemble and maintain.

Briefly, apparatus of this invention is a pneumatic power tool for reciprocating a blade relative to a workpiece to cut the workpiece with the blade. The power tool comprises a body having a hollow interior and a passage extending through the body between the hollow interior and an opening in an exterior surface of the body. The hollow interior has first and second ports spaced apart at first and second positions along a central axis of the hollow interior for alternately admitting air into the hollow interior at the first and second positions. The tool also includes a connector connected to the body in communication with the opening adapted to connect a pneumatic hose to the tool for delivering pressurized air to the tool from a pressurized air source. Further, the tool has a throttle positioned along the body passage for selectively permitting pressurized air to flow through the passage from the pneumatic hose to the hollow interior and a valve positioned along the body passage for alternately directing air flowing through the passage to pass through one of the first and second ports to pressurize the hollow interior of the body at a corresponding one of the first and second positions. In addition, the tool comprises a piston unit having a head received within the hollow interior of the body between the first and second positions for reciprocating the piston unit along a longitudinal axis of the unit between an extended position and a retracted position in response to air alternately being directed through the first and second ports and into the hollow interior of the body at the corresponding position. One of the piston unit and the body has a groove extending parallel to the longitudinal axis of the piston unit and another of the piston unit and the body has a protrusion which engages the groove and which reciprocates in the groove as the piston unit reciprocates between the extended position and the retracted position to prevent the piston unit from rotating relative to the body about the longitudinal axis.

In another aspect, apparatus of the invention is a mechanism for use in a pneumatic power tool having a body and a blade mount adapted to reciprocate relative to the body along a longitudinal axis for cutting a workpiece. The mechanism comprises a groove formed in one of the blade mount and the body extending parallel to the longitudinal axis and a protrusion formed in another of the blade mount and the body sized, shaped and located for engaging and reciprocating in the groove to prevent the blade mount from rotating relative to the body.

Other objects and features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
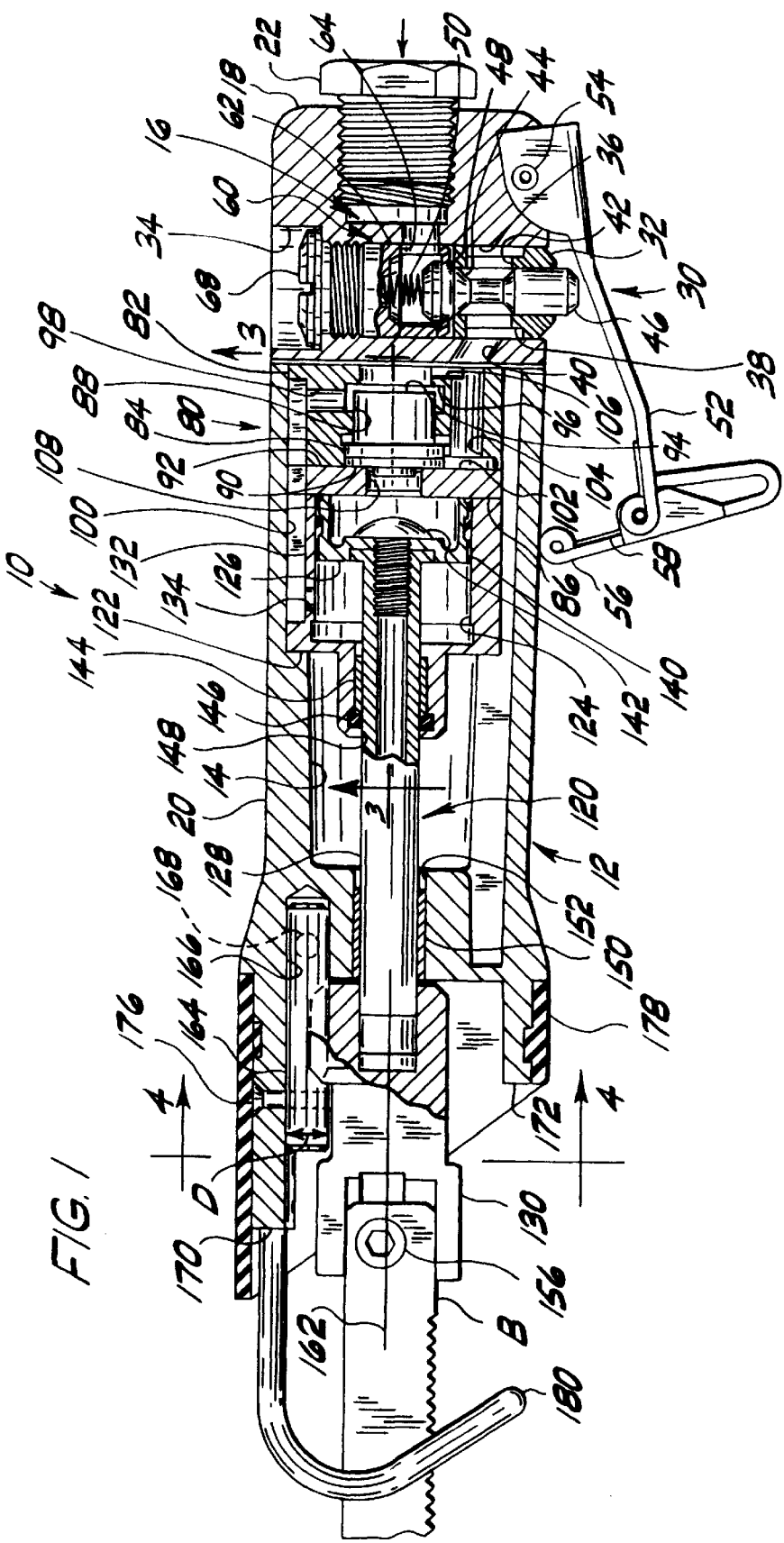
FIG. 1 is a side elevation in partial section of a reciprocating pneumatic saw of the present invention.

Referring now to the drawings and in particular to FIG. 1, a pneumatic power tool is designated in its entirety by the reference number 10. Although the present invention may apply to other reciprocating tools, in the most preferred embodiment the tool 10 is a pneumatic saw. Such saws reciprocate a blade B relative to a workpiece (not shown) to cut the workpiece with the blade.

Figure 2:
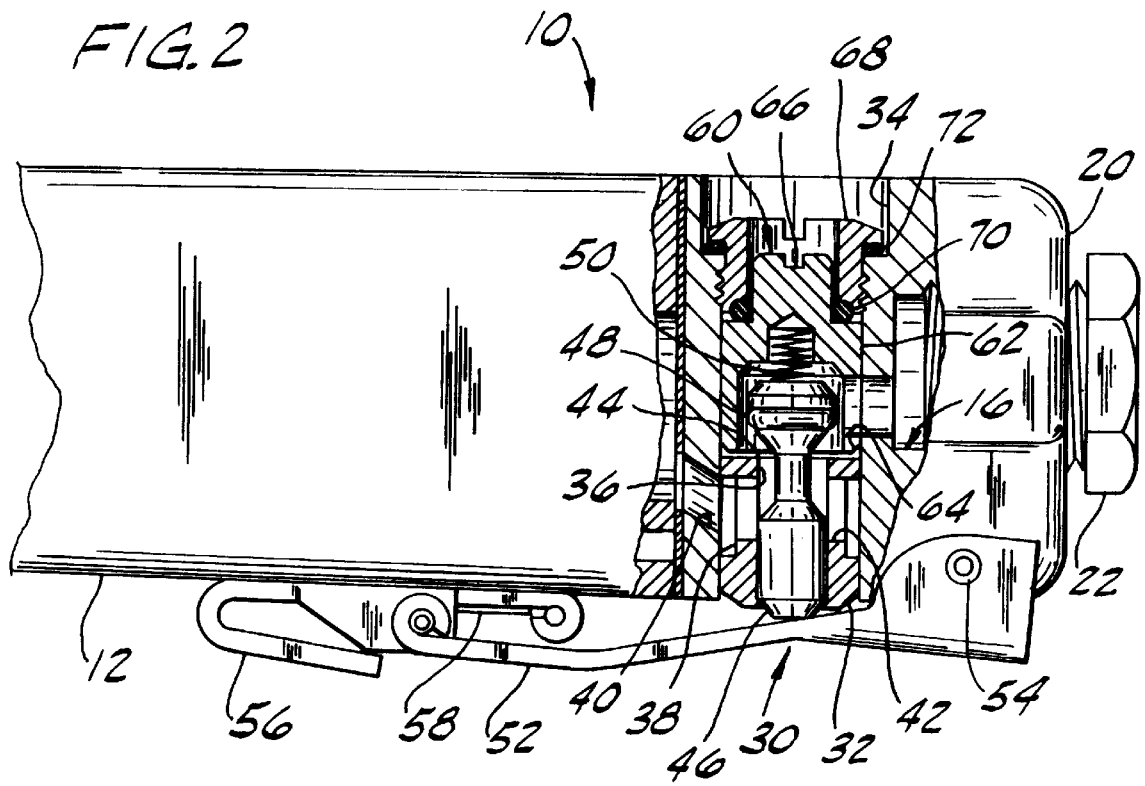
FIG. 2 is a fragmentary side elevation in partial section similar to FIG. 1 but showing a throttle of the saw in an open position.

As illustrated in FIG. 1, the power tool 10 comprises a body, generally designated by 12, having a hollow interior 14. A passage, generally designated by 16, extends through the body 12 from an opening 18 in an exterior surface 20 of the body to the hollow interior 14. A reduction pipe fitting or connector 22 is screwed into the opening 18 for connecting a conventional pneumatic hose (not shown) to the tool 10 for delivering pressurized air to the tool from a pressurized air source (not shown) such as an air compressor. As shown in FIG. 2, a throttle, generally designated by 30, is positioned along the passage 16 immediately adjacent the connector 22 for selectively permitting pressurized air to flow through the passage from the pneumatic hose to the hollow interior 14 of the body 12.

The throttle 30 includes a valve body 32 press fit in a counter-bored hole 34 extending transversely to the body 10. The valve body 32 includes a central opening 36 extending through the body and a circumferential groove 38 extending around the valve body in alignment with a slanted portion 40 of the passage 16 downstream from the valve body. Holes 42 connect the central opening 36 to the groove 38 to allow air to flow from a seat 44 at the upper end of the central opening to the slanted portion 40 of the passage 16 when the throttle is open. A poppet 46 having an O-ring 48 is biased against the seat 44 by a spring 50. When the poppet 46 is in the closed position as shown in FIG. 1, the poppet blocks flow through the passage 16. However, when the poppet 46 is in the open position as shown in FIG. 2, air flows past the poppet toward the slanted portion 40 of the passage 16.

A lever 52 is pivotally connected to the body by a split pin 54 to give the operator leverage when moving the poppet 46 from the closed position to the open position. A stop 56 is pivotally connected to the lever 52 to reduce the potential for unintentionally actuating the lever and operating the tool 10. A torsional spring 58 biases the stop 56 toward the engaged position shown in FIG. 1. In order to disengage the stop 56, the operator pivots the stop clockwise as shown in FIG. 2.

As further illustrated in FIG. 2, a rotary flow controller, generally designated by 60, is positioned above the poppet 46. The flow controller 60 includes a hollow cylindrical body 62 positioned inside the counter-bored hole 34. A hole 64 in the controller body 62 permits air to pass through the controller. The amount of air permitted to flow through the controller 60 depends on the position of the controller relative to the passage 16. When the center of the hole 64 in the controller body 62 is aligned with the center of the passage 16, flow is at a maximum, but as the center of the hole is rotated farther from the center of the passage flow is reduced. A slot 66 at the top of the controller 60 allows the controller to be rotated with a screw driver. The controller 60 is held in place in the hole 34 by a threaded fastener 68. O-rings 70, 72 prevent air from leaking around the controller 60 and fastener 68.

Figure 3:
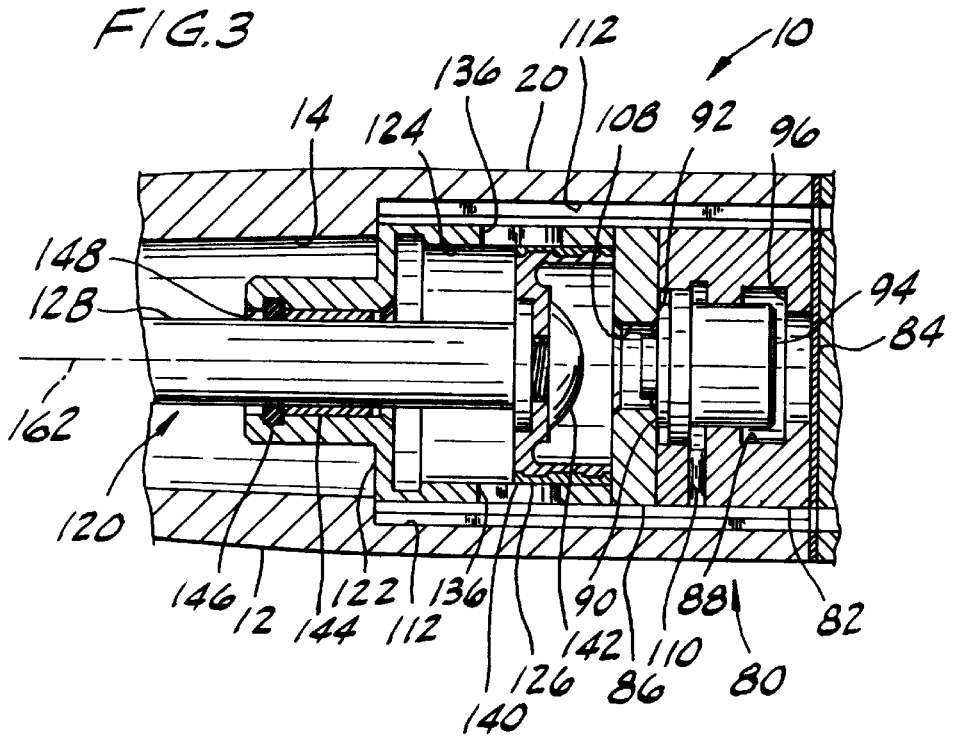
FIG. 3 is a fragmentary section taken in the plane of line 3—3 of FIG. 1.

As shown in FIG. 1, a conventional valve unit, generally designated by 80, is positioned inside the hollow interior 14 of the body 12. The valve unit 80 includes a valve body 82, a shuttle 84 and a keeper 86. The shuttle 84 is received in a central passageway 88 of the valve body 82 so it is free to slide forward to a first position (shown in FIG. 1) wherein a forward sealing surface 90 of the shuttle seals against a rearward surface 92 of the keeper 86 and backward to a second position (not shown) wherein a rearward sealing surface 94 of the shuttle seals against a shoulder 96 formed in the central passageway of the valve body. A first lateral passageway 98 extends outward from the central passageway 88 of the valve body 82 immediately forward of the shoulder. The first lateral passageway 98 joins an upper passageway 100 formed in the valve unit 80 and keeper 8,6. A second lateral passageway 102 extends outward from the central passageway 88 of the valve body 82 immediately behind the keeper 86. The second passageway 102 joins a lower passageway 104 formed in the valve body 82 below the central passageway 88. The lower passageway 104 is aligned with the slanted portion 40 of the passage 16 and a third lateral passageway 106 extends between the lower passageway 104 and the central passageway 88 immediately behind the shoulder 96. As illustrated in FIG. 3, a lateral vent passage 110 extends between the central passageway 88 and one of two longitudinal vent passages 112 on opposite sides of the body 12 to prevent air pressure from slowing the shuttle movement. The vent passages 112 extend rearward through the hollow interior 14 of the body 12 to openings (not shown) in the exterior surface 20 of the body.

A piston unit, generally designated by 120, and a cylinder housing 122 having an interior cavity 124 are positioned inside the hollow interior 14 of the body 12 immediately in front of the keeper 86. As illustrated in FIG. 1, the piston unit 120 comprises a head 126 positioned in the interior cavity 124 of the cylinder housing, a piston rod 128 extending forward from the head and a blade mount 130 positioned at the forward end of the rod opposite the head. The cylinder housing 122 has a passageway 132 aligned with the upper passageway 100 in the valve unit 80. An opening or port 134 extends between the interior cavity 124 of the cylinder housing 122 and the passageway 132 extending along the top of the cylinder housing to permit air traveling through the upper passageway 100 to enter the interior cavity of the cylinder housing. As will be appreciated by those skilled in the art, the piston unit 120 reciprocates forward and backward in the cylinder housing 122 in response to air alternately passing through the central opening 108 in the keeper 86 and the port 124 in the cylinder housing. As shown in FIG. 3, openings 136 extend from the interior cavity 124 to the vent passages 112 on each side of the cylinder housing 122.

Figure 4:
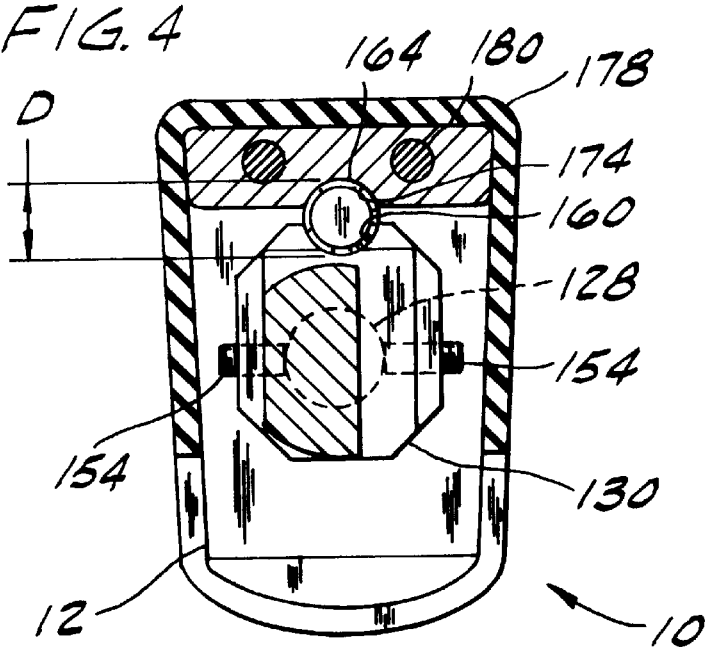
FIG. 4 is a cross section taken in the plane of line 4—4 of FIG. 1.
Figure 5:
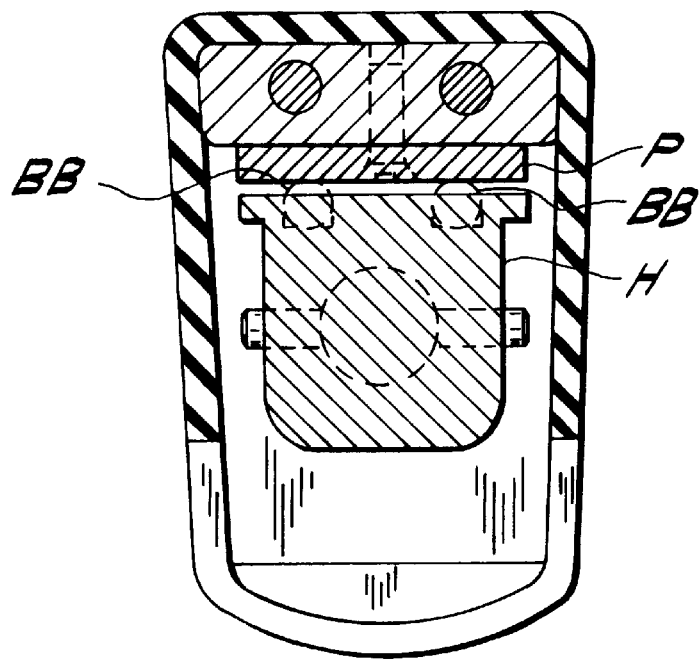
FIG. 5 is a cross section similar to FIG. 4 but showing a prior art design.

As illustrated in FIG. 1, a conventional piston seal 140 surrounds the piston head 126 which is fastened to the piston rod 128 with a screw 142. The piston rod 128 extends through a bushing 144 and an O-ring 146 mounted in a central opening 148 in the cylinder housing 122 and through another bushing 150 mounted in a central opening 152 at the forward end of the body 12. The blade mount 130 is fastened to the piston rod 128 with set screws 154 (FIG. 4) and a threaded fastener 156 holds the blade B on the mount. As illustrated in FIG. 4, a groove 160 formed in the blade mount 130 extends parallel to a longitudinal axis 162 (FIG. 1) of the piston unit 120 and receives a pin 164 mounted on the body 12 adjacent the groove. The pin 164 forms a protrusion which engages the groove 160 to prevent the piston unit 120 from rotating relative to the body 12 as it reciprocates back and forth. Although the groove 160 and pin 164 may have other sizes and shapes without departing from the scope of the present invention, the groove and pin of the preferred embodiment are cylindrical and have a common diameter D of about six millimeters.

As shown in FIG. 1, the rearward end of the pin 164 is received in a socket 166 formed in the body 12 and fastened in place with a set screw 168 (shown in phantom). Upper and lower tongues, respectively designated by 170 and 172, extend forward from the body 12 above and below the blade mount 130. As shown in FIG. 4, a groove 174 formed in the lower side of the upper tongue 170 receives the upper side of the pin 164, and a screw 176 (FIG. 1) extending through the upper tongue 170 fastens the forward end of the pin 164 to the body 12. A shroud 178 surrounds the upper and lower tongues 170, 172 to reduce the opportunity for foreign objects to contact the slider mechanism formed by the pin 164 and groove 160. A wire guard 180 extends around the blade B from the upper tongue 170 to reduce the opportunity for the blade mount 130 to contact the workpiece.

When the lever 52 is depressed so the poppet 46 is in the open position as shown in FIG. 2, air flows past the poppet toward the slanted portion 40 of the passage 16. For reasons which will become apparent shortly, when the throttle is open the shuttle 84 moves back and forth between the first position in which its forward surface 90 seals against the rearward surface 92 of the keeper 86 and the second position in which its rearward surface 94 seals against the shoulder 96. This shuttle movement causes the piston unit 120 to reciprocate in the cylinder housing 122 which drives the blade mount 130 and blade B back and forth to cut a workpiece.

When the shuttle 84 is in the first position, air travels from the slanted portion 40 of the passage 16 through the third lateral passageway 106, the central passageway 88, the first lateral passageway 98, the upper passageway 100 and the port 134 to pressurize the interior cavity 124 of the cylinder housing 122 at a first position corresponding to its forward end. As the pressurized air enters the cylinder housing 122 near the forward end, the piston unit 120 moves backward in the cylinder housing. Initially, air behind the piston head 126 is exhausted through the openings 136 on each side of the interior cavity 124 and the vent passages 112 which extend beside the cylinder housing 122 to the exterior of the tool. However, as the piston head 126 continues to travel backward, it covers the openings 136 in the cylinder housing 122 so pressure behind the piston head 126 builds. When the pressure behind the piston head becomes sufficiently great, the shuttle 84 moves backward to the second position. The piston unit 120 is near its retracted position when the shuttle 84 moves backward to the second position.

When the shuttle 84 is in the second position, air travels from the slanted portion 40 of the passage 16 through the lower passageway 104, the second lateral passageway 102 and the port 108 to pressurize the interior cavity 124 of the cylinder housing 122 at a second position corresponding to its rearward end. As the pressurized air enters the cylinder housing 122 at the rearward end, the piston unit 120 moves forward in the cylinder housing. Air in front of the piston head 126 is exhausted through the openings 136 on each side of the interior cavity 124 and the vent passages 112 to the exterior of the tool until the piston head covers the openings. As the piston head 126 continues to travel forward, it unblocks the vent passages 112 so the pressurized air behind the head begins to vent. This causes a pressure drop behind the piston head 126 and in front of the shuttle 84 so the shuttle returns to the first position. The piston unit 120 is near its extended position when the shuttle 84 moves forward.

Thus, the piston unit 120 reciprocates along its longitudinal axis 162 and a coinciding central axis of the hollow interior 14 of the body 12 between extended and retracted positions in response to air alternately being directed through the first and second ports into the interior cavity 124 of the cylinder housing 122. As the piston unit 120 reciprocates between its extended and retracted positions, the pin 164 reciprocates in the groove 160 in the blade mount 130 to prevent the piston unit from rotating relative to the body 12.

Due to the wide areas of contact between the pin 164 and the groove 160, the previously described mechanism has relatively low contact stresses and wear. Further, the pin and groove slider mechanism of the present invention is not particularly susceptible to damage or jamming because debris slides along the pin and groove to clear itself from the mechanism rather than being carried farther into the mechanism. In addition, because the mechanism is not obscured by surrounding hardware, it is easily accessible during periodic lubrication. Moreover, due to the relatively small number of pieces which must be assembled, the mechanism of the present invention is easy and inexpensive to assemble and maintain.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A pneumatic power tool for reciprocating a blade relative to a workpiece to cut the workpiece with the blade, the power tool comprising:

a body having a hollow interior and a passage extending through the body between the hollow interior and an opening in an exterior surface of the body, the hollow interior having first and second ports spaced apart at first and second positions along a central axis of the hollow interior for alternately admitting air into the hollow interior at said first and second positions;

a connector connected to the body in communication with the opening adapted to connect a pneumatic hose to the tool for delivering pressurized air to the tool from a pressurized air source;

a throttle positioned along the body passage for selectively permitting pressurized air to flow through the passage from the pneumatic hose to the hollow interior;

a valve positioned along the body passage for alternately directing air flowing through the passage to pass through one of the first and second ports to pressurize the hollow interior of the body at a corresponding one of said first and second positions;

a piston unit having a head received within the hollow interior of the body between said first and second positions for reciprocating the piston unit along a longitudinal axis of the unit between an extended position and a retracted position in response to air alternately being directed through the first and second ports and into the hollow interior of the body at the corresponding one of said first and second positions, wherein one of the piston unit and the body has a groove extending parallel to the longitudinal axis of the piston unit, and wherein another of the piston unit and the body has a protrusion which engages the groove and which reciprocates in the groove as the piston unit reciprocates between the extended position and the retracted position thereby to prevent the piston unit from rotating relative to the body about the longitudinal axis.

2. A power tool as set forth in claim 1 wherein the piston unit has the groove and the body has the protrusion.

3. A power tool as set forth in claim 2 wherein the piston unit further comprises a piston rod extending from the head and a blade mount positioned at an end of the rod opposite the head, and wherein the groove is formed in the blade mount.

4. A power tool as set forth in claim 3 wherein the body includes a pin forming the protrusion, the pin being mounted on the body adjacent the groove and extending parallel to the central axis of the interior of the body.

5. A power tool as set forth in claim 4 wherein the pin and the groove are substantially cylindrical.

6. A power tool as set forth in claim 5 wherein the diameters of the pin and the groove are about six millimeters.

7. In a pneumatic power tool having a body and a blade mount adapted to reciprocate relative to the body along a longitudinal axis for cutting a workpiece, a configuration wherein one of the blade mount and the body has a groove extending parallel to the longitudinal axis, and wherein another of the blade mount and the body has a protrusion which engages the groove and which reciprocates in the groove as the blade mount reciprocates thereby to prevent the blade mount from rotating relative to the body about the longitudinal axis.

8. A mechanism for use in a pneumatic power tool having a body and a blade mount adapted to reciprocate relative to the body along a longitudinal axis for cutting a workpiece, the mechanism comprising:

a groove formed in one of the blade mount and the body extending parallel to the longitudinal axis; and a protrusion formed in another of the blade mount and the body sized, shaped and located for engaging and reciprocating in the groove thereby to prevent the blade mount from rotating relative to the body about the longitudinal axis.

* * * * *